March 11, 1958     JIRO MUKAI     2,826,117
HIGH APERTURE WIDE-ANGLE OBJECTIVE FOR
CINEMATOGRAPHIC CAMERAS
Filed May 23, 1956

INVENTOR.
JIRO MUKAI
BY
ATTORNEY

2,826,117
HIGH APERTURE WIDE-ANGLE OBJECTIVE FOR CINEMATOGRAPHIC CAMERAS

Jiro Mukai, Musashino City, Tokyo, Japan, assignor to Canon Camera Company, Inc., Otaku, Tokyo, Japan, a corporation of Japan Application May 23, 1956, Serial No. 586,869

Claims priority, application Japan December 12, 1955

2 Claims. (Cl. 88—57)

This invention relates to a high aperture wide-angle lens for cinematographic cameras.

An object of this invention is to provide a long back-focus, the essential condition for a cinematographic camera objective, and to provide for superior correction of the spherical, comatic, astigmatic and chromatic aberrations and distortion of image.

Figure 1:
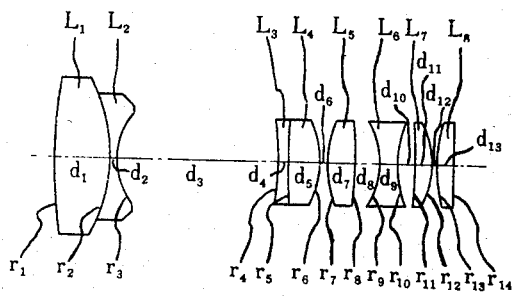
Figures 2, 3:
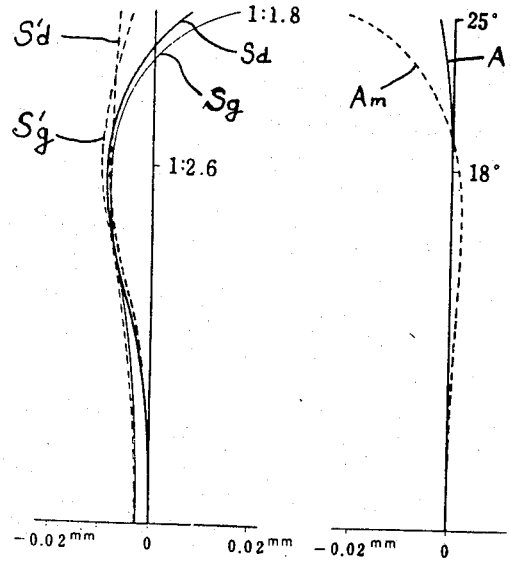
Figure 4:
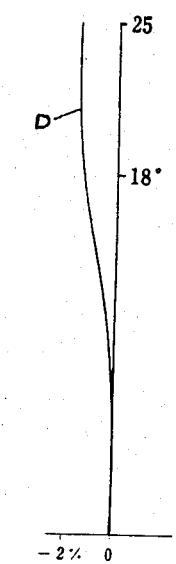

A clear concept of the scope and purpose of this invention may be obtained from the following description, taken in connection with the attached drawing, in which:

Fig. 1 is a sectional view of an illustrative embodiment of a wide-angle lens for cinematographic cameras according to this invention having an image field of 50° and a relative aperture F:1.8; and Figs. 2, 3 and 4 respectively show the curves of the spherical, astigmatic and distortional aberrations thereof.

The objective shown in Fig. 1 comprises six components consisting of eight lens elements. The first component is a negative meniscus lens consists of a first bi-convex lens $L_1$ and a bi-concave lens $L_2$ cemented thereto at one optical surface $r_2$. The cemented surface $r_2$ has a collecting effect with its concave surface towards the object. The second component is a positive meniscus lens with its convex surface towards the image side and consists of the cemented negative lens $L_3$, the positive lens $L_4$ and its cemented surface $r_5$ thereof being convex towards the object. The third component $L_5$ is a bi-convex single element spaced from the second component with its more strongly curved surface $r_7$ towards the object, the fourth component a bi-concave single element $L_6$ air spaced from the third component, the fifth component $L_7$ a collective meniscus element with its more strongly curved surface $r_{12}$ towards the image, while the sixth component $L_8$ is a single bi-convex element air spaced from the fifth component with its stronger convex surface $r_3$ towards the object. The enumerated components are all axially aligned and constructed in accordance with the following conditions:

(1) In the first component:
The ratio of the radius of curvature $r_1/r_3$ of the first surface $r_1$ and the third surface $r_3$ is between 4 and $\infty$; the thickness $d_1$ of element $L_1$ on the optical axis is between 0.4 $f$ and 1.2 $f$; the radius of curvature of the cemented surface $r_2$ is between $-1.5 f$ and $-3.0 f$; the difference in the refractive indices of the $d$-lines of the spectrum of $L_1$ and $L_2$ is between 0.12 and 0.18 (wherein $f$ is the equivalent focal length of the objective).

(2) In the second component:
The ratio of the radius of curvature $r_4/r_6$ of the front surface $r_4$ and the rear surface $r_6$ is between 1.5 and 4.5; the thickness $d_5$ of $L_4$ on the optical axis is between 0.3 $f$ and 0.7 $f$.

(3) The air-space $d_3$ between the first and the second components is between 1.5 $f$ and 3.5 $f$;

(4) The thickness $d_7$ of $L_5$ on the optical axis is between 0.2 $f$ and 0.6 $f$; and (5) The arithmetic mean value of the refractive indices of the $d$-lines of the spectrum of $L_5$, $L_6$, $L_7$, $L_8$ is between 1.6 and 1.8.

Remark:
$r_1, r_2 \ldots$ is the radius of the curvature of the respective surface;
$d_1, d_2 \ldots$ is the thickness of and the air space between, the respective lenses, the respective subscripts increasing from the object to the image side of the objective.

It is basically necessary for a wide-angle objective with a long back-focus to give a strongly dispersive lens for the first component, but this dispersive lens will naturally produce thereby a considerably large distortion and image curvature, more particularly of the meridional image plane. The shape of the first component and the refractive indices of the elements comprising the first component are important on the correction of said defects. This invention proposes to correct distortion and image curvature by giving the abovementioned condition (1) of, namely, $4 < r_1/r_3 < \infty$, $-3 f < r_2 < -1.5 f$, $$0.12 < n_1 - n_2 < 0.18$$

which, however may produce comatic aberration which can readily be corrected by constructing the second component to satisfy the abovementioned condition (2), namely $1.5 < r_4/r_6 < 4.5$ and $0.3 f < d_5 < 0.7 f$. It is also effective for reducing the image curvature to satisfy condition (3), namely, $1.5 f < d_3 < 3.5 f$ for the air-space between the first and second components, as does, as has been stated, condition (1). It is necessary to reduce zonal aberration to as small a value as possible in order to obtain a high aperture objective and this can be attained by satisfying conditions (4) and (5), namely, $0.2 f < d_7 < 0.6 f$ and $$1.6 < \frac{n_5 + n_6 + n_7 + n_8}{4} < 1.8$$

(where $n_1$, $n_2$ . . . is the refractive index for the $d$-line of the spectrum of elements $L_1$, $L_2$, . . . respectively).

Thus this invention offers to obtain a high aperture wide-angle lens having a long back-focus for cinematographic cameras by satisfying the aforesaid conditions. The following shows one example of a practical embodiment:

[$f=1$. Image field $2\alpha=50°$. F:1.8. Back focus=1.4$f$.]

| Lens | Radius | Thickness or Spacing | Refractive Index | Abbe Number |
|---|---|---|---|---|
| $L_1$ | $r_1=$ 8.022 | $d_1=0.835$ | $n_1=1.6645$ | $\nu_1=35.9$ |
| $L_2$ | $r_2=-2.262$ | $d_2=0.109$ | $n_2=1.5101$ | $\nu_2=63.4$ |
|  | $r_3=$ 0.988 | $d_3=2.537$ |  |  |
|  | $r_4=-5.066$ |  |  |  |
| $L_3$ |  | $d_4=0.142$ | $n_3=1.672$ | $\nu_3=32.2$ |
| $L_4$ | $r_5=$ 17.755 | $d_5=0.474$ | $n_4=1.5101$ | $\nu_4=63.4$ |
|  | $r_6=-1.708$ | $d_6=0.123$ |  |  |
|  | $r_7=$ 1.408 |  |  |  |
| $L_5$ |  | $d_7=0.397$ | $n_5=1.6935$ | $\nu_5=53.5$ |
|  | $r_8=-8.442$ | $d_8=0.345$ |  |  |
|  | $r_9=-1.285$ |  |  |  |
| $L_6$ |  | $d_9=0.308$ | $n_6=1.7283$ | $\nu_6=28.3$ |
|  | $r_{10}=$ 1.649 | $d_{10}=0.262$ |  |  |
|  | $r_{11}=-11.034$ |  |  |  |
| $L_7$ |  | $d_{11}=0.291$ | $n_7=1.6935$ | $\nu_7=55.3$ |
|  | $r_{12}=-1.117$ | $d_{12}=0.029$ |  |  |
|  | $r_{13}=$ 2.923 |  |  |  |
| $L_8$ |  | $d_{13}=0.251$ | $n_8=1.6935$ | $\nu_8=53.5$ |
|  | $r_{14}=-23.008$ |  |  |  | where $f$ is the equivalent focal length of the objective; $L_1$, $L_2$, . . . $L_8$ represent the individual optical elements from the front to the rear thereof $r_1, r_2, \ldots r_{14}$ the distance between successive optical surfaces thereof $n_1, n_2, \ldots n_8$ the index of refraction of the optical elements; and $v_1, v_2, \ldots v_8$ the Abbe number thereof Figures 2, 3 and 4 show the graphs of the aberrations of the objectives of the instant invention; $S_d$ is the graph of the spherical aberration of the spectrum $d$-line; $S_d'$ that of the deviation of the spectrum $d$-line from the sine condition, $S_g$ that of the spherical aberration for the spectrum $g$-line; $S_g'$ that of the spectrum $g$-line deviation from the sine condition, $A_s$ that of the sagital field curvature, $A_m$ that of the meridional field curvature, and finally D is the graph of the distortion aberration for each angle of incidence.

What I claim is:

1. A high aperture wide-angle objective for cinematographic cameras comprising six air spaced components of which the first component consists of a first bi-convex element $L_1$ cemented to a first bi-concave element $L_2$ to constitute a dispersive meniscus component, the cemented surface $r_2$ having a collecting effect, the second component is a positive meniscus component with its convex surface facing the image and consisting of a dispersive element $L_3$ cemented at surface $r_5$ to a collective element $L_4$ and spaced from the first component, the third component is a second bi-convex element $L_5$ spaced from the second component with its stronger curved surface facing the object side of the objective, the fourth component is a second bi-concave element $L_6$ spaced from the third component, the fifth component is a collective meniscus element $L_7$ with its stronger curved surface facing the image side of the objective and spaced from the fourth component, and the sixth component is a third bi-convex element $L_8$ spaced from the fifth component, and the radii of curvature of the successive optical surfaces $r_{subscript}$ and the distances $d_{subscript}$ therebetween, the subscripts increasing from the object to the image side of the objective, and the indices of refraction $n_{subscript}$ satisfy the following conditions:

$$4 < r_1/r_3 < \infty$$

$$1.5f < |r_3| < 3f$$

$$1.5 < r_4/r_6 < 4.5$$

$$0.4f < d_1 < 1.2f$$

$$0.3f < d_5 < 0.7f$$

$$1.5f < d_6 < 3.5f$$

$$0.2f < d_7 < 0.6f$$

$$0.12 < n_1 - n_2 < 0.18$$

$$1.6 < \frac{n_5 + n_6 + n_7 + n_8}{4} < 1.8$$

where $f$ is the equivalent focal length of the objective.

2. A high aperture wide angle objective for cinematographic cameras comprising six air spaced components of which the first component consists of a first bi-convex element cemented to a first bi-concave element to constitute a dispersive meniscus component, the second component is a positive meniscus component with its convex surface facing the image and consisting of a dispersive element cemented to a collective element, the third component is a second bi-convex element with its stronger curved side facing the object, the fourth component is a second bi-concave element, the fifth component is a collective meniscus element with its stronger curved surface facing the image, and the sixth component is a third bi-convex element, in which the radii of curvature, $r_{subscript}$, of the individual optical surfaces in succession from the object side of the objective, the distances, $d_{subscript}$, along the optical axis of the element thicknesses and the air spacings, the refactive indices, $n_{subscript}$, and the dispersion numbers, $v_{subscript}$, of the individual lens elements, $L_{subscript}$, are:

[$f=1$. Image field $2\alpha=50°$. $F{:}1.8$. Back focus=$1.4 f$.]

| Lens | Radius | Thickness or Spacing | Refractive Index | Abbe Number |
|---|---|---|---|---|
| $L_1$ | $r_1 = 8.022$ | $d_1 = 0.835$ | $n_1 = 1.6645$ | $v_1 = 35.9$ |
| $L_2$ | $r_2 = -2.262$ | $d_2 = 0.109$ | $n_2 = 1.5101$ | $v_2 = 63.4$ |
|  | $r_3 = 0.988$ | $d_3 = 2.537$ |  |  |
|  | $r_4 = -5.066$ |  |  |  |
| $L_3$ |  | $d_4 = 0.142$ | $n_3 = 1.672$ | $v_3 = 32.2$ |
| $L_4$ | $r_5 = 17.755$ | $d_5 = 0.474$ | $n_4 = 1.5101$ | $v_4 = 63.4$ |
|  | $r_6 = -1.708$ | $d_6 = 0.123$ |  |  |
|  | $r_7 = 1.408$ |  |  |  |
| $L_5$ |  | $d_7 = 0.397$ | $n_5 = 1.6935$ | $v_5 = 53.5$ |
|  | $r_8 = -8.442$ | $d_8 = 0.345$ |  |  |
|  | $r_9 = -1.285$ |  |  |  |
| $L_6$ |  | $d_9 = 0.308$ | $n_6 = 1.7283$ | $v_6 = 28.3$ |
|  | $r_{10} = 1.649$ | $d_{10} = 0.262$ |  |  |
|  | $r_{11} = -11.034$ |  |  |  |
| $L_7$ |  | $d_{11} = 0.291$ | $n_7 = 1.6935$ | $v_7 = 55.3$ |
|  | $r_{12} = 1.117$ | $d_{12} = 0.029$ |  |  |
|  | $r_{13} = 2.923$ |  |  |  |
| $L_8$ |  | $d_{13} = 0.251$ | $n_8 = 1.6935$ | $v_8 = 53.5$ |
|  | $r_{14} = -23.008$ |  |  |  |

References Cited in the file of this patent

UNITED STATES PATENTS

| | | |
|---|---|---|
| 1,934,561 | Rayton | Nov. 7, 1933 |
| 2,317,790 | Mellor | Apr. 27, 1943 |
| 2,324,057 | Bennett | July 13, 1943 |
| 2,582,085 | Tolle | Jan. 8, 1952 |
| 2,612,077 | Albrecht | Sept. 30, 1952 |
| 2,752,821 | Cook | July 3, 1956 |

FOREIGN PATENTS

| | | |
|---|---|---|
| 741,511 | Great Britain | Dec. 7, 1955 |